US009982207B2

(12) United States Patent
Jacob

(10) Patent No.: US 9,982,207 B2
(45) Date of Patent: May 29, 2018

(54) DIESEL FUEL BASED ON ETHANOL

(75) Inventor: Eberhard Jacob, Krailling (DE)

(73) Assignee: MAN Truck & Bus AG, Munich (DE)

( * ) Notice: Subject to any disclaimer, the term of this patent is extended or adjusted under 35 U.S.C. 154(b) by 387 days.

(21) Appl. No.: 12/721,984

(22) Filed: Mar. 11, 2010

(65) Prior Publication Data
US 2010/0242347 A1 Sep. 30, 2010

(30) Foreign Application Priority Data

Mar. 27, 2009 (DE) ........................ 10 2009 015 347

(51) Int. Cl.
| C10L 1/19 | (2006.01) |
| C10L 1/185 | (2006.01) |
| C10L 1/182 | (2006.01) |
| C10L 10/02 | (2006.01) |
| C10L 1/02 | (2006.01) |
| C10L 1/10 | (2006.01) |
| C10L 1/16 | (2006.01) |
| C10L 1/18 | (2006.01) |

(52) U.S. Cl.
CPC ............. *C10L 10/02* (2013.01); *C10L 1/026* (2013.01); *C10L 1/10* (2013.01); *C10L 1/1852* (2013.01); *C10L 1/1608* (2013.01); *C10L 1/1616* (2013.01); *C10L 1/1811* (2013.01); *C10L 1/1824* (2013.01); *C10L 1/19* (2013.01); *Y02E 50/13* (2013.01)

(58) Field of Classification Search
USPC ....... 44/307, 451, 452, 446; 530/205, 391.5; 568/697; 435/252.33, 320.1; 502/111; 536/23.7
See application file for complete search history.

(56) References Cited

U.S. PATENT DOCUMENTS

| 1,338,982 | A | 5/1920 | Hayes |
| 1,398,947 | A | 11/1921 | Schreiber |
| 1,495,094 | A | 5/1924 | Morgan |
| 1,501,383 | A | 7/1924 | White |
| 1,684,686 | A | 9/1928 | Records |
| 2,117,610 | A | 5/1938 | Jean |
| 3,902,868 | A | 9/1975 | Zoch, Jr. |
| 4,323,712 | A * | 4/1982 | Imai ............................ 568/697 |
| 4,892,561 | A | 1/1990 | Levine |
| 5,183,476 | A | 2/1993 | Carisson et al. |
| 5,628,805 | A | 5/1997 | Lif et al. |
| 5,906,664 | A | 5/1999 | Basu et al. |
| 2005/0089685 | A1* | 4/2005 | Hamada ............... C10M 169/04 428/408 |
| 2007/0049727 | A1* | 3/2007 | Pollock et al. ............... 530/205 |
| 2007/0056213 | A1 | 3/2007 | French et al. |
| 2007/0083319 | A1 | 4/2007 | Wilharm et al. |
| 2008/0086935 | A1 | 4/2008 | Cunningham et al. |
| 2008/0216390 | A1* | 9/2008 | Tebben et al. .................. 44/307 |
| 2008/0244960 | A1 | 10/2008 | Fischer et al. |
| 2009/0031614 | A1* | 2/2009 | MacPherson et al. .......... 44/307 |
| 2009/0126262 | A1* | 5/2009 | Asthana et al. ................ 44/388 |
| 2013/0030160 | A1* | 1/2013 | Miao et al. ................ 530/391.5 |

FOREIGN PATENT DOCUMENTS

| EP | 0 019 340 A1 | 11/1980 |
| EP | 0 403 516 B1 | 9/1993 |
| GB | 2 143 846 A | 2/1985 |
| WO | WO 81/00721 A1 | 3/1981 |
| WO | WO 89/07637 A1 | 8/1989 |
| WO | WO 2007/079765 A1 | 7/2007 |
| WO | WO 08/1248900 A1 | 10/2008 |
| WO | WO 2008/124800 A1 | 10/2008 |

OTHER PUBLICATIONS

Official Action dated Aug. 11, 2010—Europe.
Official Action dated Jun. 18, 2010—Russia.
Office Action in corresponding German apl. No. 10 2009 015 347.0 dated Apr. 27, 2012 Application 10 2009 015 347.0.
International Search Report for PCT/US08/59807 dated Sep. 10, 2008.
Urban Lofvenberg "Bioethanol fuel for public transport" Ethanol Bus Buyers' Consortium, 31 pages.
Official Communication from Russian Application No. 2010111705/05(06490), dated Sep. 2, 2011.
Dementiev, V. N., "Sbornik metodicheskih recommendatsiy po voprosam expertisy izobreteniy," VNIIPI, Moscow, 1983, pp. 43-47.
Office Action from CN201010176748.9, dated Apr. 1, 2013.
Nord, K., et al., "Statistical Evaluation of Rapeseed Methyl Ester as Ignition Improver in an 11 Liters Ethanol Fuel Diesel Engine", Technical Report, 2008.
European Opposition from EP2233552 mailed Sep. 28, 2012.
European Opposition from EP2233552 mailed Nov. 8, 2013.
Delivery order Ö-viks Buss AB, Apr. 10, 2002.
Executive summary of Egon Larsson's report "Nya Alkoholbränslen för tunga nyttofordon", 2002.
Decision to Discontinue Opposition Proceedings in Application No. EP 2233552 mailed Apr. 28, 2014.
Office Communication for Indian Application No. 731/DEL/2010 dated Dec. 19, 2016.
Nord et al., Particulate Emissions From an Ethanol Fueled Heavy-Duty Diesel Engine Equipped with EGR, Catalyst, and DPF, SAE International. Paper No. 2004-01-1987, Jun. 8, 2004, 17 pages.

* cited by examiner

*Primary Examiner* — Ellen McAvoy
*Assistant Examiner* — Chantel Graham
(74) *Attorney, Agent, or Firm* — Wolf, Greenfield & Sacks, P.C.

(57) ABSTRACT

A diesel fuel based on ethanol is described, which comprises about 60 to about 90% (v/v) ethanol, up to about 20% (v/v) of a linear dialkyl ether with a chain length of about 10 to about 40 as well as mixtures thereof, and 0 to about 30% (v/v) combustion accelerator.

18 Claims, 2 Drawing Sheets

DIESEL FUEL BASED ON ETHANOL

RELATED APPLICATIONS

This application claims priority to German Application No. 102009015347.0, filed Mar. 27, 2009, which is incorporated herein by reference in its entirety for all purposes.

DESCRIPTION

Figure 1:
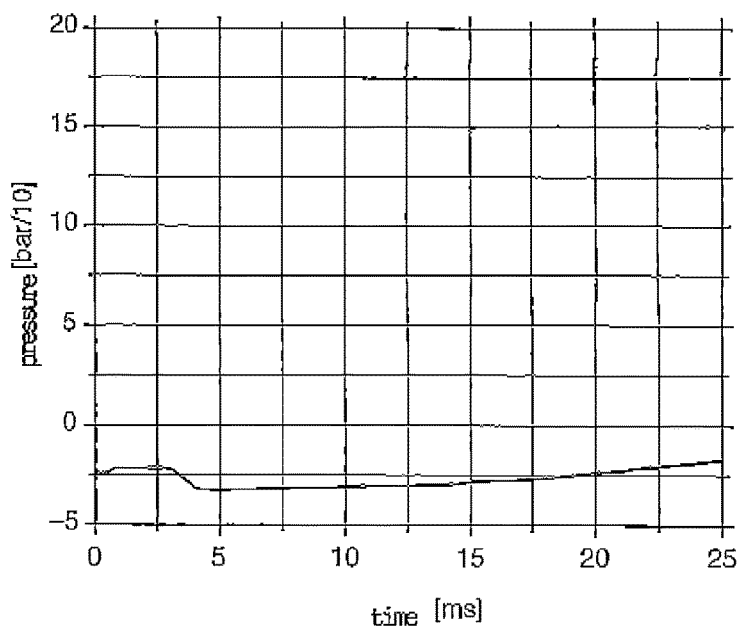
FIG. 1 is a plot of pressure as a function of time showing the ignition delay and combustion speed of conventional commercial Etamax D.

The invention relates to a diesel fuel based on ethanol.

Ethanol is increasingly being used as a fuel for spark ignition engines. The spark ignition engine fuel currently used in Brazil is a mixture of ethanol and petrol in different ratios. E85, which consists 85% of absolute ethanol and 15% petrol, has been obtainable for years in Sweden.

A fuel based on ethanol was, however, hitherto not suitable for diesel engines, in particular for two reasons. Firstly, auto ignition is linked with a considerable ignition delay, which is a result of the fact that the cetane number of ethanol is only about 8, while cetane numbers of more than 30 are required for suitable diesel fuels. Furthermore, the combustion speed after ignition is substantially lower than in conventional diesel fuels, which leads to losses of efficiency.

It is known to increase the compression ratio of the diesel engine from about 17 to 18 to about 28 in order to improve the auto ignition. This engine solution, in which an increase in the end temperature occurs, was selected by the company Scania in Sweden. However, it leads to an increased mechanical strain on the engine, which ultimately can only be avoided by a power reduction. In addition, an ignition accelerator based on high-molecular, non-volatile polyethylene glycol derivatives in a quantity of about 3 to 7% (v/v) has to be added to the E85. This diesel fuel also has the trade name Etamax D. The use of Etamax D leads, however, to undesired particle emissions because of the addition of the polyethylene glycol derivatives (SAE 2004-01-1987).

The use of glycerol ethoxylate as an ignition accelerator according to U.S. Pat. No. 5,628,805 has also proven to be disadvantageous with regard to the particle emissions.

A diesel fuel based on ethanol, containing polyalkylene glycol compounds as an ignition improver, is described in EP 0 403 516. This fuel is, however, not very effective and also leads to undesired particle emissions.

The invention is based on the object of avoiding the above disadvantages, in particular the particle emissions and providing a diesel fuel based on ethanol, which can be used in conventional diesel engines.

This object is achieved by a diesel fuel based on ethanol, which comprises about 60 to about 90% (v/v) ethanol, up to about 20% (v/v) of a linear dialkyl ether with a chain length of about 10 to about 40 as well as mixtures thereof, and 0 to about 30% by weight combustion accelerator.

Accordingly, one or more linear dialkyl ethers, which combusts/combust substantially without particle emissions, is/are added to the ethanol. Only particles of non-combusted organic compounds, which can be eliminated at the oxidation catalyst, can be produced. The particle emissions of the diesel fuel according to the invention are below about 5 mg/kWh in the test cycles, preferably below about 2 mg/kWh in the test cycles (ESC, ETC, WHDC (dieselnet.com)). The diesel fuel according to the invention automatically ignites even at compression ratios of below 21. The diesel fuel according to the invention can be used in conventional diesel engines and is distinguished by a low ignition delay, a high combustion speed and a high heating value. The ignition delay is preferably not above 9 ms, particularly preferably not above 8.5 ms and quite particularly preferably not above 8.0 ms. Moreover, the use of one or more dialkyl ethers leads to it being possible to dispense with a denaturing agent. The diesel fuel according to the invention is a high-value diesel fuel on a biogenic basis.

The linear dialkyl ether is preferably present in a quantity of up to about 10% (v/v), particularly preferably in a quantity of up to about 5% (v/v). As the dialkyl ether is the most expensive of the components contained in the diesel fuel according to the invention, it is advantageous to use this in a quantity which is as small as possible.

The linear dialkyl ethers used in the diesel fuel according to the invention have a chain length of about 10 to about 40. When counting the chain length, the oxygen atom is included. The chain length is preferably about 10 to about 30 and particularly preferably about 17 to about 25. Dihexyl ether, diheptyl ether, dioctyl ether, dinonyl ether, didecyl ether, diundecyl ether, dilauryl ether and dimyristyl ether are particularly suitable. Dioctyl ether, didecyl ether and dilauryl ether are particularly suitable as they are the most economical to produce.

The linear dialkyl ether preferably only has one ether bond.

It is furthermore preferred for the linear dialkyl ether to be free of alcohol groups.

The linear dialkyl ethers are preferably predominantly straight-chained, which means at most branched a little, i.e. contain only up to three, advantageously up to two $C_1$-$C_4$ alkyl groups.

The dialkyl ethers used are preferably used as solubilisers between ethanol and the combustion accelerator, if the latter is used. Mixing is preferably still possible at −20° C.

Ethanol (absolute) is used in a quantity of about 60 to about 95% (v/v), in particular in a quantity of about 65 to 85% (v/v) and particularly preferably in a quantity of about 70 to about 80% (v/v).

The combustion accelerator is present in a quantity of about 0 to about 30% (v/v), preferably in a quantity of about 2 to about 25% (v/v). In particular, the combustion accelerator is present in a quantity of about 5 to about 20% (v/v), quite particularly preferably in a quantity of about 5 to about 50% (v/v). This has the advantage that, while retaining the desired properties, the content of the expensive dialkyl ether can be reduced.

The combustion accelerator has the object of increasing the combustion speed after ignition. The combustion accelerator additionally increases the heating value of the fuel.

The combustion accelerator is preferably selected from the group consisting of diesel fuels or spark ignition engine fuel components.

The diesel fuels are particularly preferably hydrogenated plant oil, FAME, FAEE and mixtures thereof, as these can be mixed particularly well with ethanol and also the linear dialkyl ether. The use of FAME to DIN EN 14214 (2004), in particular rapeseed oil methyl ester (RME), palm oil methyl ester (PME) and soya oil methyl ester (SME), is quite particularly preferred as these can be mixed particularly well with ethanol and the linear dialkyl ether and still further increase the heating value of the diesel fuel according to the invention.

Spark ignition engine fuel components, in particular hexane and petroleum ether are also suitable, in particular, as combustion accelerators.

In a preferred embodiment, the diesel fuel according to the invention based on ethanol comprises about 60 to about 80% (v/v) ethanol, about 2.5 to about 15% (v/v) linear dialkyl ether as well as mixtures thereof and about 15% to about 25% (v/v) combustion accelerator.

In particular, the diesel fuel according to the invention based on ethanol comprises about 65 to about 75% (v/v) ethanol, about 2.5 to about 12.5% (v/v) linear dialkyl ether and about 17.5 to about 22.5% (v/v) combustion accelerator.

In a quite particularly preferred embodiment, the diesel fuel according to the invention based on ethanol comprises about 75% (v/v) ethanol, about 5% (v/v) linear dialkyl ether and about 20% (v/v) combustion accelerator.

If no combustion accelerator is used, the diesel fuel according to the invention based on ethanol preferably comprises about 70% (v/v) ethanol and about 30% (v/v) linear dialkyl ether.

EXAMPLE 1 (COMPARATIVE EXAMPLE)

The ignition delay and the combustion speed of conventional commercial Etamax was measured by an advanced fuel ignition delay analyser (AFIDA) from the company ASG, Neusäß (US 2007/0083319) (see FIG. 1). The injection pressure was 800 bar, the compartment temperature 600° C., the compartment pressure 50 bar, the injection period 600 ms and the injection quantity 22 mg.

The ignition delay was above 25 ms, in other words no ignition took place.

EXAMPLE 2

Figure 2:
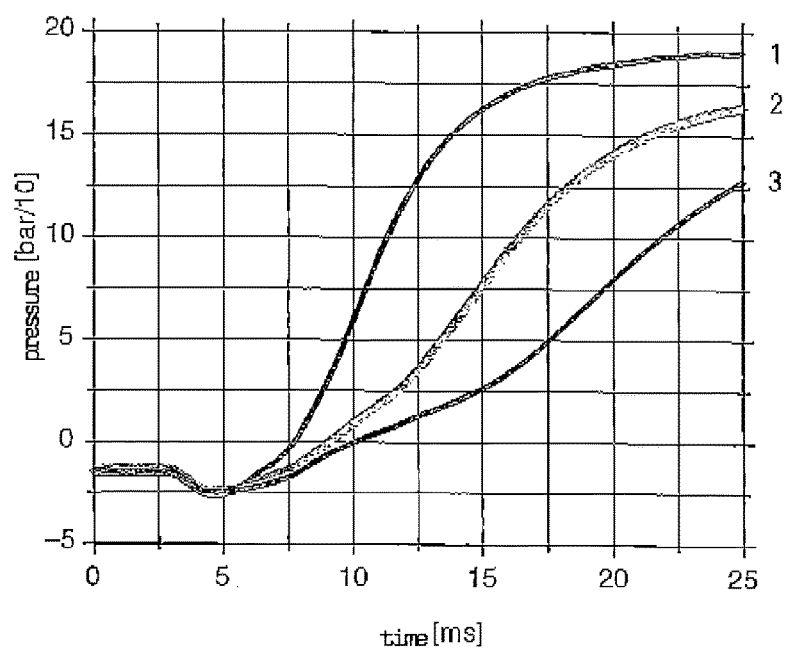
FIG. 2 is a plot of pressure as a function of time for fuels 1, 2, and 3 described in Example 2.

The diesel fuels according to the invention based on ethanol, given below, were tested analogously to Example 1 (FIG. 2).

TABLE 1

| No. | Ethanol (absolute) [% (v/v)] | Dialkyl ether [% (v/v)] | Combustion accelerator [%(v/v)] | Ignition delay [ms] |
|---|---|---|---|---|
| 1 | 70 | Dioctyl ether 10 | Palm oil methyl ester 20 | 7.5 |
| 2 | 70 | Didecyl ether 10 | Soya oil methyl ester 20 | 7.8 |
| 3 | 75 | Dilauryl ether 5 | Soya oil methyl ester 20 | 7.8 |

The ignition delay is reduced compared to the prior art (Etamax D) (Etamax D>25 ms). Added to this is the fact that the combustion speed is significantly increased.

EXAMPLE 3

Figure 3:
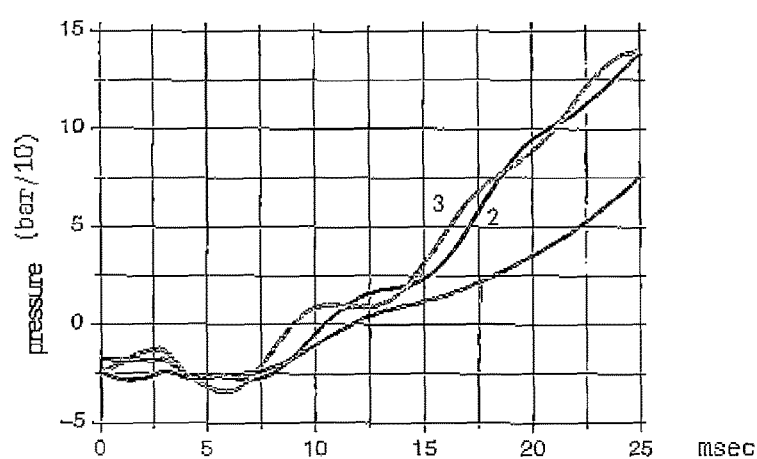
FIG. 3 is a plot of pressure as a function of time for fuels 1, 2, and 3 described in Example 3.

The diesel fuels according to the invention based on ethanol given below were tested analogously to Example 1 (FIG. 3).

TABLE 2

| No. | Ethanol (absolute) [% (v/v)] | Dialkyl ether [% (v/v)] | Combustion accelerator [% (v/v)] | Ignition delay [ms] |
|---|---|---|---|---|
| 1 | 70 | Dioctyl ether 10 | Rapeseed oil methyl ester 20 | 7.5 |
| 2 | 70 | Didecyl ether 10 | Rapeseed oil methyl ester 20 | 7.8 |
| 3 | 70 | Dilauryl ether 10 | Rapeseed oil methyl ester 20 | 7.8 |

Compared to the prior art (Etamax D) the ignition delay is reduced (Etamax D>25 ms). Added to this is the fact that the combustion speed is significantly increased. The pressure increases and therefore the combustion speed are higher when using didecyl ether (2) and dilauryl ether (3) in comparison to the dioctyl ether (1).

EXAMPLE 4

Analogously to Example 1, measurements were carried out on ethanol additive mixtures with 70% (v/v) ethanol and 30% (v/v) ether. The following ignition delays were thus determined:

| | |
|---|---|
| Dibutyl ether | >15 ms |
| Dihexyl ether | 8.5 ms |
| Dioctyl ether | 7.9 ms |
| Ethylene glycol diethyl ether | >15 ms |
| Formaldehyde diethyl acetal, 99.7% | >15 ms |
| Tetrahydropyran anhydrous, 99% | >15 ms |
| Dimethoxymethane, 98% | >15 ms |
| n-butyl ethyl ether, 99% | >15 ms |
| Butyl ethyl ether, 99% | >15 ms |
| Di-tert-butyl peroxide [2%] | >15 ms |
| Decanol | 12.5 ms |
| THF | >15 ms |

This example shows that the combustion accelerator can optionally be completely dispensed with.

The invention claimed is:

1. A method, comprising:
    igniting a fuel in a diesel engine, the fuel comprising:
        about 60 to about 95% (v/v) ethanol;
        linear dialkyl ether selected from the group consisting of dihexyl ether, diheptyl ether, dioctyl ether, dinonyl ether, didecyl ether, diundecyl ether, dilauryl ether, dimyristyl ether, as well as mixtures thereof, wherein the linear dialkyl ether is present in an amount of up to about 20% (v/v); and
        a combustion accelerator.

2. The method according to claim 1, wherein the linear dialkyl ether is present in the fuel in a quantity of up to about 10% (v/v).

3. The method according to claim 1, wherein the combustion accelerator is present in the fuel in a quantity of about 2 to about 25% (v/v).

4. The method according to claim 1, wherein the combustion accelerator is present in the fuel in an amount of up to about 30% (v/v), and the combustion accelerator is selected from diesel fuels or spark ignition engine fuel components.

5. The method according to claim 4, wherein the diesel fuel is selected from the group consisting of hydrogenated plant oil, fatty-acid methyl ester, fatty-acid ethyl ester, and mixtures thereof.

6. The method according to claim 5, wherein the fatty-acid methyl ester is a fatty-acid methyl ester that meets the requirements of DIN EN 14214 (2004).

7. The method according to claim 6, wherein the fatty-acid methyl ester that meets the requirements of DIN EN 14214 (2004) is a rapeseed oil methyl ester, a soya oil methyl ester, or a palm oil methyl ester.

8. The method according to claim 4, wherein the spark ignition engine fuel component is hexane or petroleum ether.

9. The method according to claim 1, wherein the ethanol is present in the fuel in a quantity of about 65 to about 85% (v/v).

10. The method according to claim 1, wherein the linear dialkyl ether is present in the fuel in a quantity of up to about 5% (v/v).

11. The method according to claim 1, wherein the combustion accelerator is present in the fuel in a quantity of about 5 to about 20% (v/v).

12. The method according to claim 1, wherein the ethanol is present in the fuel in a quantity of about 70% to about 80% (v/v).

13. The method according to claim 1, wherein the ethanol is present in the fuel in a quantity of about 60 to about 80% (v/v).

14. The method according to claim 1, wherein the linear dialkyl ether is present in the fuel in a quantity of about 2.5 to about 15% (v/v).

15. The method according to claim 1, wherein the combustion accelerator is present in the fuel in a quantity of about 15 to about 25% (v/v).

16. The method according to claim 1, wherein the combustion accelerator is present in the fuel in a quantity of about 15 to about 20% (v/v).

17. The method according to claim 1, wherein:
the ethanol is present in the fuel in a quantity of about 60 to about 80% (v/v);
the linear dialkyl ether is present in the fuel in a quantity of about 2.5 to about 15% (v/v);
the combustion accelerator is present in the fuel in a quantity of about 15 to about 25% (v/v); and
the combustion accelerator is a fatty-acid methyl ester that meets the requirements of DIN EN 14214 (2004).

18. A method, comprising:
igniting a fuel in a diesel engine, the fuel comprising:
about 70 to about 95% (v/v) ethanol; and
linear dialkyl ether selected from the group consisting of dihexyl ether, diheptyl ether, dioctyl ether, dinonyl ether, didecyl ether, diundecyl ether, dilauryl ether, dimyristyl ether, as well as mixtures thereof, wherein the linear dialkyl ether is present in an amount of up to about 30% (v/v).

* * * * *